Nov. 14, 1972 V. H. BERRY, JR 3,702,661
STORAGE TANK ASSEMBLY AND METHOD OF INSTALLING IT
Filed March 6, 1970
2 Sheets-Sheet 1

INVENTOR
VAN H. BERRY, JR.
Richards, Harris & Hubbard
ATTORNEY

Nov. 14, 1972　　　　　　V. H. BERRY, JR　　　　　3,702,661
STORAGE TANK ASSEMBLY AND METHOD OF INSTALLING IT
Filed March 6, 1970　　　　　　　　　　　　2 Sheets-Sheet 2

INVENTOR
VAN H. BERRY, JR.

Richards, Harris & Hubbard
ATTORNEY

United States Patent Office 3,702,661
Patented Nov. 14, 1972

3,702,661
STORAGE TANK ASSEMBLY AND METHOD
OF INSTALLING IT
Van H. Berry, Jr., Dallas, Tex., assignor to Trinity
Industries, Incorporated, Dallas, Tex.
Filed Mar. 6, 1970, Ser. No. 17,210
Int. Cl. B60p 1/64
U.S. Cl. 214—152        1 Claim

ABSTRACT OF THE DISCLOSURE

A storage tank assembly includes a product receiving and storing tank and a pair of tank supporting assemblies each comprising a pair of tank raising and lowering jacks and a jack operating mechanism. The storage tank assembly is preferably installed at a distribution plant by operating the jacks of the tank supporting assemblies to raise the tank, positioning a tractor and a pole trailer under the tank, operating the jacks to lower the tank onto the tractor and the pole trailer and operating the tractor to transport the assembly to the distribution plant. At the plant, the jacks are operated to raise the tank off of the tractor and the pole trailer, the tractor and the pole trailer are removed and the jacks are operated to lower and level the tank.

BACKGROUND OF THE INVENTION

At the present time, products such as anhydrous ammonia, liquefied petroleum gas, etc. are initially delivered to storage tank assemblies located at distribution plants. Typically, storage tank assemblies for such products comprise large product receiving and storing tanks having various "plumbing" items mounted on them, including motors, pumps and/or compressors, valves, fittings, etc. The products are stored in the tanks until needed, whereupon they are distributed by trucks to various ultimate consumers, including farms, etc.

Heretofore, storage tank assemblies for anhydrous ammonia, liquefied petroleum gas, etc. have been fabricated in several steps. First, the product receiving tank of such an assembly is constructed at a tank manufacturing facility. Then, the tank is transported to a distribution plant by means of a tractor and a pole trailer. At the plant, the tank is positioned on a pair of concrete tank supporting members by a crane. If necessary, the tank is leveled by means of various shims, etc.

After the tank is in place at the plant, the various plumbing items of the assembly are mounted on the tank. This work is usually performed by technicians that travel to the plant from the tank manufacturing facility. Finally, the various components of the assembly are inspected and tested.

The storage tank assembly fabricating procedure outlined above is unsatisfactory for several reasons. First, it requires the rental of a crane for the purpose of lifting the tank off of the tractor and the pole trailer and onto its supporting members. This adds to the expense of fabricating the assembly. Second, it necessitates the travel of technicians from the tank manufacturing facility to the distribution plant which also adds to the fabrication expense. Third, it requires final testing and inspection at the plant. This is unsatisfactory because it prevents the use of uniform, rigidly controlled testing and inspection procedures.

The present invention relates to an improved storage tank assembly and to a method of installing it. In the practice of the invention, a storage tank assembly, including a tank, its supporting assemblies and its plumbing items is completely assembled at a tank manufacturing facility. This permits complete inspection and testing of the assembly at the manufacture facility and eliminates the necessity of sending technicians to distribution plants. Preferably, the supporting assemblies of the storage tank assembly include tank raising and lowering members, whereby the assembly can be installed at the distribution plant without the use of a crane.

SUMMARY OF THE INVENTION

In accordance with the preferred embodiment of the invention, a storage tank assembly comprises a storage tank and a tank supporting assembly including a tank raising and lowering mechanism. Preferably, the storage tank assembly is installed at a distribution plant by operating the tank raising and lowering mechanism to maneuver the assembly onto and off of a transporting apparatus.

DESCRIPTION OF THE DRAWINGS

A more complete understanding of the invention may be had by referring to the following detailed description when taken in conjunction with the drawings, wherein.

DETAILED DESCRIPTION

Figure 1:
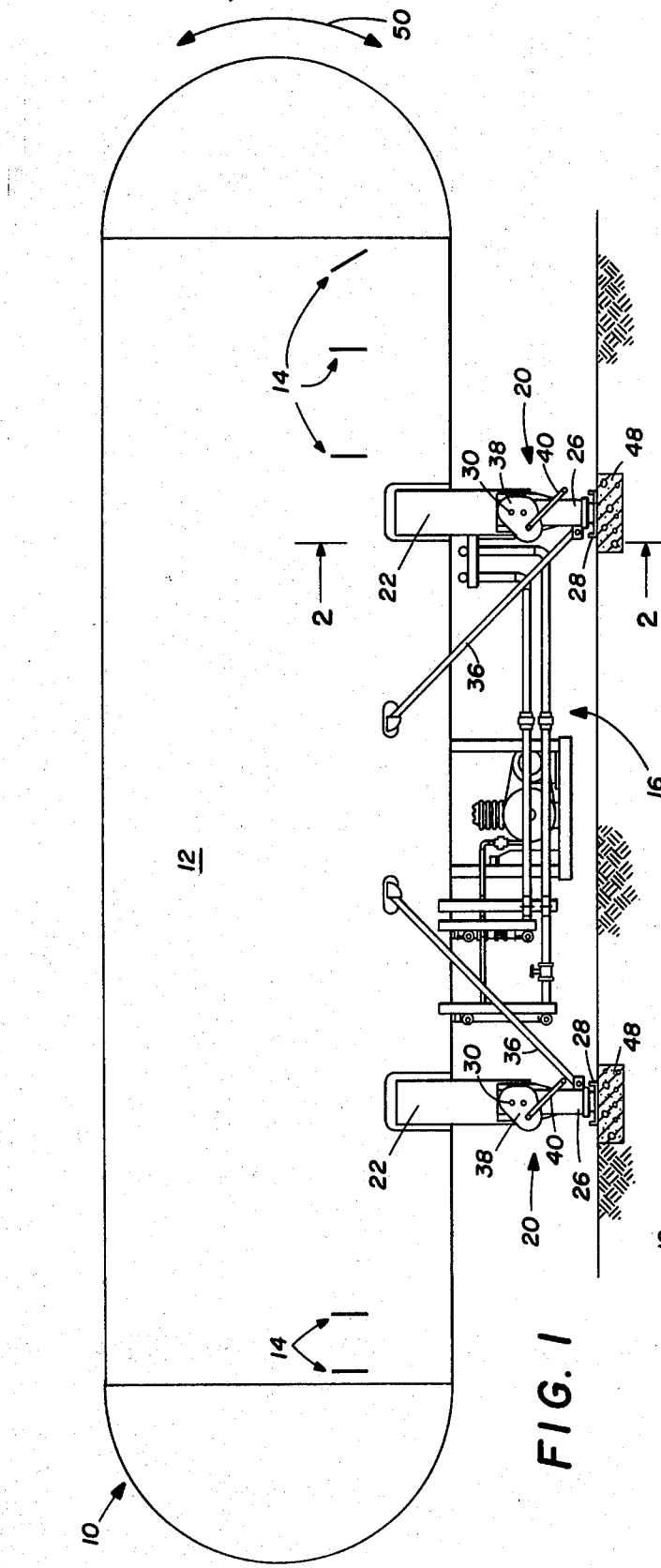
FIG. 1 is a side view of a storage tank assembly employing the invention.

Referring now to the drawings, and particularly to FIG. 1, a storage tank assembly 10 employing the present invention is shown. The assembly 10 includes a tank 12 of the type commonly employed to receive and store anhydrous ammonia, liquefied petroleum gas, and similar products. The tank 12 has a plurality of tie-down rings 14 fixed to it and has various "plumbing" items 16 mounted on it. The plumbing items 16 of the storage tank assembly 10 include such diverse items as motors, pumps and/or compressors, valves, fittings, piping, and the like.

Figure 3:
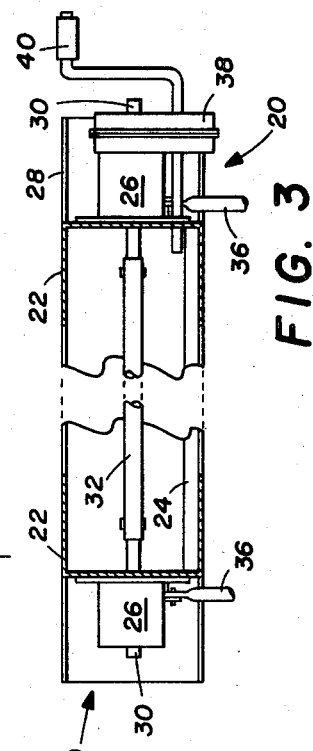
FIG. 3 is a sectional view taken generally along the line 3—3 in FIG. 2.
Figure 2:
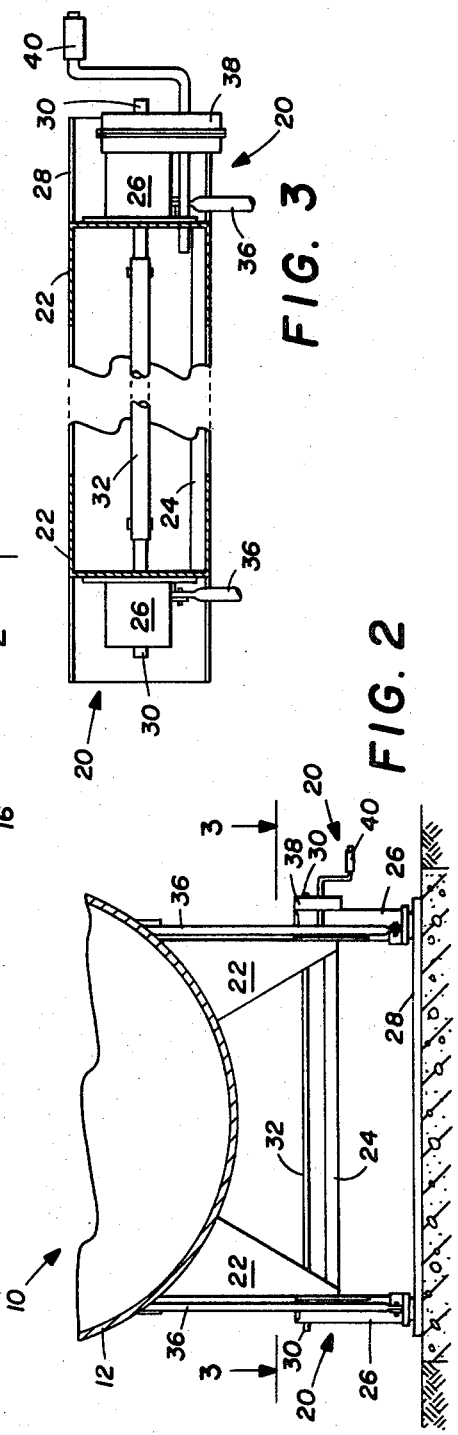
FIG. 2 is a sectional view taken generally along the line 2—2 in FIG. 1.

The tank 12 is supported on a pair of tank supporting assemblies 20. As is best shown in FIGS. 2 and 3, each assembly 20 includes a pair of upper members 22 which are fixed to and which extend downwardly from the tank 12. The lower portions of the upper members 22 of each supporting assembly 20 are interconnected by a cross brace 24.

Each tank supporting assembly 20 further includes a pair of jacks 26 which are mounted on the upper members 22 of the assembly and which extend to a foot 28. The jacks 26 include jack shafts 30 which are interconnected by a drive shaft 32 and, accordingly, the jacks 26 of each assembly 20 operate simultaneously. As is best shown in FIG. 1, a pair of braces 36 are connected between the tank 12 and the jacks 26 of each tank supporting assembly 20.

Referring now to FIGS. 1, 2 and 3, each tank supporting assembly 20 includes a jack operating mechanism 38. The jack operating mechanism 38 of each assembly 20 is mounted on one of the jacks 26 of the assembly and is coupled to the jack shaft 30 of that jack. Each jack operating mechanism 38 includes a operating handle 40. Preferably, the mechanisms 38 are so constructed that operation of a handle 40 in one manner increases the distance between the foot 28 of its assembly 20 and the tank 12 and so that operation of the handle in another manner decreases the distance between the foot 28 and the tank 12.

The jacks 26 of the tank supporting assemblies 20 of the storage tank assembly 10 may comprise any of the commercially available jacks and may be of the screw type, the ratchet type, the hydraulic type, etc. Of course, the nature of the jack operating mechanisms 38 depends upon the nature of the jacks 26. Preferably, the jacks 26 include power screws and the jack operating mechanisms 38 comprise two speed transmissions so that the jacks 26 may be operated in both high speed and high torque modes. A combination jack and jack operating mechanism suitable for use in the assemblies 20 is sold by the Binkley Company of Warrenton, Mo., and is identified by that company as Model 50,000.

Figure 4:
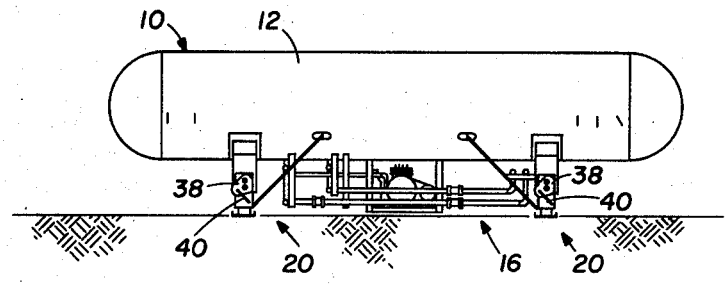
FIGS. 4, 5, 6, and 7 are illustrations of various steps comprising a method of installing the storage tank assembly shown in FIGS. 1, 2 and 3.

A method of installing the storage tank assembly shown in FIGS. 1, 2 and 3 is illustrated in FIGS. 4, 5, 6 and 7. Referring first to FIG. 4, the storage tank assembly 10 is preferably completely assembled at a tank manufacturing facility. That is, the tank supporting assemblies 20 and the plumbing items 16 of the assembly 10 are preferably mounted on the tank 12 prior to the start of the installation procedure. This permits complete inspection and testing of the storage tank assembly 10 at the tank manufacturing facility.

The installation procedure for the storage tank assembly 10 begins with the operation of the handles 40 of the jack operating mechanisms 38 of the tank supporting assemblies 20 to increase the distance between the feet 28 and the tank 12. This action raises the tank 12 and is continued until the tank is in its most elevated position. Then, a tractor 42 and a pole trailer 44 are positioned under the opposite ends of the tank 12 in the manner shown in FIGS. 5 and 6.

When the tractor 42 and the pole trailer 44 are properly positioned, the jacks 26 are operated to lower the tank 12 onto the tractor and the trailer and to raise the feet 28 to their uppermost positions relative to the tank 12. Then, the storage tank assembly 10 is secured to the tractor 42 and to the trailer 44. Preferably, this is accomplished by connecting straps 46 between the tie-down rings 14 on the tank 12 and various points on the tractor and on the trailer.

After the storage tank assembly 10 is secured to the tractor 44 and to the trailer 46, the tractor is operated to transport the assembly 10 to a distribution plant. At the plan, the tractor 46 is operated to position the feet 28 of the tank supporting assemblies 20 in alignment with a pair of concrete footers, such as the footers 48 illustrated in FIG. 1. Thereafter, the storage tank assembly 10 is mounted on the footers.

Figure 5:
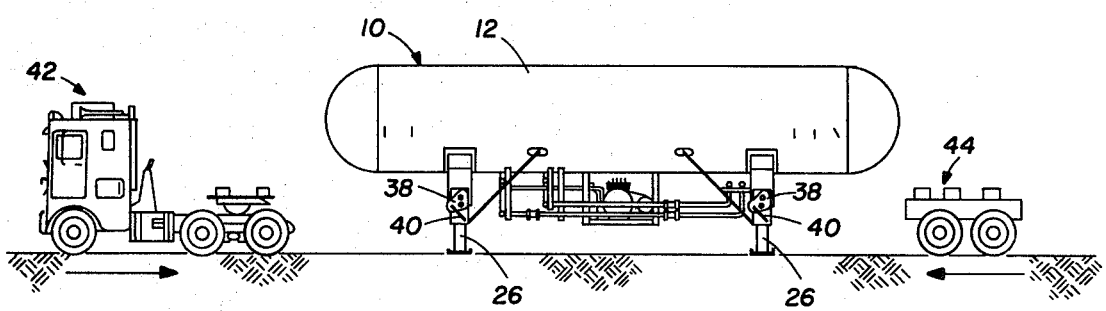
Figure 6:
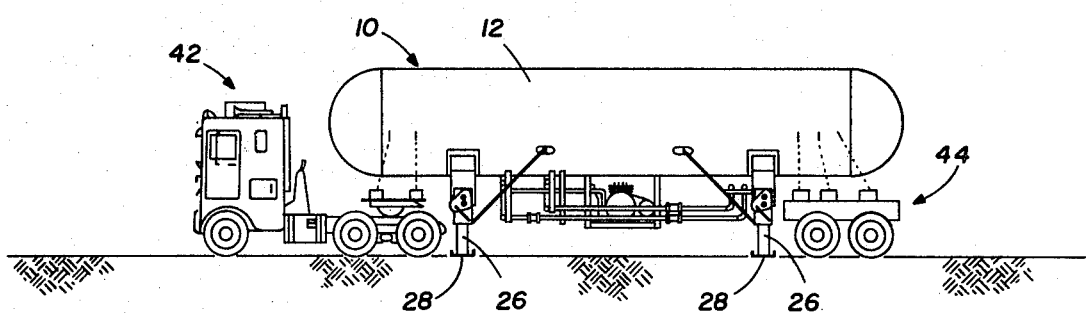
Figure 7:
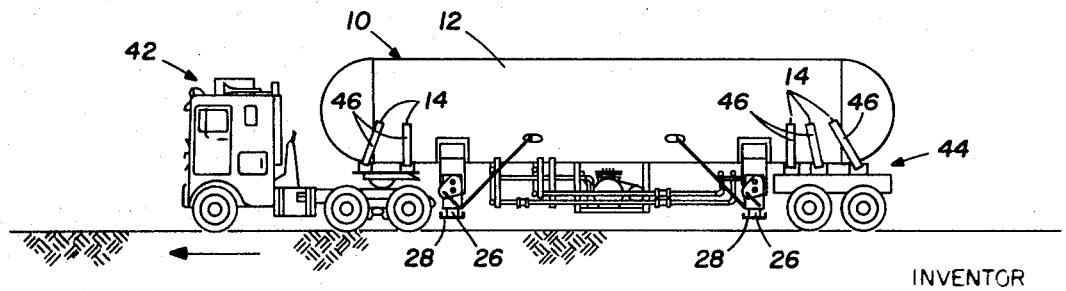

The steps involved in mounting the storage tank assembly 10 at the distribution plant are similar to the steps shown in FIGS. 4, 5 and 6 except that they are carried out in reverse order. First, the straps 46 are removed and the handles 40 of the jack operating mechanisms 38 are operated to cause the jacks 26 to lower the feet 28 relative to the tank 12. This action raises the tank 12 of the tractor 42 and the pole trailer 44, whereupon the tractor and the trailer are removed. Finally, the handles of the mechanisms 38 are operated to cause the jacks 26 to lower the tank 12 and to level the tank. The latter action causes the tank 12 to rotate about a transverse axis in the manner indicated by the arrow 50 shown in FIG. 1.

The use of the present invention results in several advantages over the prior art. For example, the use of the invention permits all of the manufacturing, testing and inspecting operations that are involved in the fabrication of storage tank assemblies to be performed at a tank manufacturing facility. This in turn permits the use of uniform, rigidly controlled testing procedures and thereby assures the installation of storage tank assemblies that are free of defects. The use of the invention also eliminates the necessity of sending technicians to distribution plants to install the plumbing items of a storage tank assembly.

Another advantage that results from the use of the present invention is the elimination of the necessity of renting a crane for use in lifting a storage tank off of a tractor and pole trailer and onto its supporting members. A further advantage is the elimination of the use of shims, etc. to level storage tanks.

Although a specific storage tank assembly and a specific method of installing the assembly are illustrated in the drawings and described herein, it will be understood that the invention is not limited to the assembly and method disclosed but is capable of rearrangement, modification and substitution of parts and elements without departing from the spirit of the invention.

What is claimed is:

1. A method of installing a storage tank assembly for LP gas or the like comprising:
    fabricating a storage tank to completion at a manufacturing facility including the mounting of gas pumping apparatus on the tank;
    establishing tank receiving structure at a tank installation location;
    raising the tank by means of jacks fixedly attached to the tank;
    positioning a tractor and a pole trailer under the opposite ends of the tank;
    lowering the tank onto the tractor and the pole trailer by means of the jacks;
    securing the tank to the tractor and to the pole trailer;
    transporting the tank from the manufacturing facility to the installation location by means of the tractor and the pole trailer;
    positioning the jacks in alignment with the tank receiving structure by means of the tractor;
    engaging the jacks with the tank receiving structure;
    releasing the tank from the tractor and the pole trailer;
    raising the tank by means of the jacks;
    withdrawing the tractor and the pole trailer from under the tank;
    lowering the tank by means of the jacks;
    leveling the tank by means of the jacks and
    thereafter receiving gas in and pumping gas from the storage tank without further fabrication of the tank.

References Cited

UNITED STATES PATENTS

| | | | |
|---|---|---|---|
| 2,703,659 | 3/1955 | Hutchins | 280—423 X |
| 3,211,313 | 10/1965 | Katz | 214—515 |
| 3,285,449 | 11/1966 | Hand | 214—515 |
| 3,352,461 | 11/1967 | Dascanio | 280—5 E |
| 3,285,449 | 11/1966 | Hand | 214—515 |

FOREIGN PATENTS

| | | | |
|---|---|---|---|
| 1,486,431 | 5/1967 | France | 280—5 E |
| 1,108,606 | 9/1955 | France | 280—5 E |

ALBERT J. MAKAY, Primary Examiner

U.S. Cl. X.R.

280—5 C, 404; 214—515